United States Patent [19]

Thornburg

[11] 4,177,421

[45] Dec. 4, 1979

[54] CAPACITIVE TRANSDUCER

[75] Inventor: David D. Thornburg, Los Altos, Calif.

[73] Assignee: Xerox Corporation, Stamford, Conn.

[21] Appl. No.: 881,287

[22] Filed: Feb. 27, 1978

[51] Int. Cl.$^2$ ............................................. G01R 27/26
[52] U.S. Cl. .................................. 324/61 R; 340/200; 340/365 C; 307/116; 200/DIG. 1
[58] Field of Search ........................... 324/61 R, 61 P; 340/166 R, 200, 324 M, 365 C; 200/DIG. 1, DIG. 2; 307/116

[56] References Cited

U.S. PATENT DOCUMENTS

| | | | |
|---|---|---|---|
| T904,008 | 11/1972 | Crouse | 340/365 C |
| 2,534,505 | 12/1950 | Ergen | 340/200 |
| 2,659,533 | 11/1953 | Quinby et al. | 340/365 C X |
| 2,725,510 | 11/1955 | Reid | 340/200 |
| 3,151,239 | 9/1964 | Lecroart et al. | 340/200 X |
| 3,222,668 | 12/1965 | Lippel | 340/200 |
| 3,296,522 | 1/1967 | Wolfendale | 324/61 R |
| 3,517,282 | 6/1970 | Miller | 324/61 R |
| 3,974,332 | 8/1976 | Abe et al. | 340/365 C X |
| 4,090,092 | 5/1978 | Serrano | 200/DIG. 1 X |
| 4,103,252 | 7/1978 | Bobick | 200/DIG. 1 X |

Primary Examiner—Stanley T. Krawczewicz
Attorney, Agent, or Firm—W. Douglas Carothers, Jr.

[57] ABSTRACT

A capacitive transducer comprises two plate electrodes positioned in juxtaposed relationship on one surface of a dielectric substrate and an array of segmented electrodes provided on the opposite side of the substrate. Capacitive coupling is achieved between the segmented electrode array and the two plate electrodes. The geometrics of the transducer are such that increasing capacitive coupling is obtained along the main axis of the transducer. An AC signal supplied to one of the plate electrodes of the transducer can be attenuated by physically touching the segmented electrode array. Attenuation can be varied by moving such physical contact along the main axis of the transducer. One or more transducer can be used in a coordinate arrangement to provide an X-Y position indicating device.

20 Claims, 13 Drawing Figures

CAPACITIVE TRANSDUCER

This invention relates generally to an active transducer and more particularly concerns a capacitive type transducer and its application as an X-Y position indicating device.

BACKGROUND OF INVENTION

There are many types of transducers of the active type where the input to the transducer may be altered by other received stimuli at another input to produce an output from the transducer indicative of a change in a particular parameter. For example, a potentiometer or rheostat may be used to electrically indicate a particular physical position relative to an X-Y coordinate system. The shaft encoder is another example of mechanical transducer capable of indicating the position of one element relative to another element. A piezoelectric device can be used to electrically indicate the amount of pressure or weight applied to the device.

One of the primary uses of a transducer is to indicate position. An example of an application for a positional indicating transducer is cursor control devices in text editing apparatus, gaming apparatus and other visual display apparatus. In this particular application, a mechanical control mechanism may be employed to interact with information displayed on the screen of the apparatus. An example of such a control mechanism is U.S. Pat. No. 3,987,685 wherein a transport sphere is coupled with rotatable shafts which represent the position of the device in terms of X and Y coordinates. Other examples of such mechanical control mechanisms are cited in this patent. U.S. Pat. No. 3,728,480 discloses a control mechanism in a gaming apparatus provided with a plurality of rotatable knobs that act as rheostats in providing coordinate information for a cursor on the CRT display.

These control mechanisms employ moving parts which are susceptible to mechanical wear, inaccuracies due to transitional misalignments of component parts or inaccuracies due to mechanical limitations during transitional movement in a direction transverse to generally designated cartesian coordinates. The employment of an electronic position indicating device would at least reduce, if not eliminate, the impact of these disadvantages.

An example of electronic position indicating device is the special pen and tablet wherein the pen makes contact with a general tablet from which certain information is derived indicating the coordinate positions of the pen. While such devices are particularly useful in detailed graphical input display devices, they are much more cumbersome in a text display system where the pen must be held at all times during editing text displayed on the device as well as necessitating the pick up and laying down of the pen each time an editing operation is to be performed. From this particular standpoint, a positional transducer functioning as a cursor position device by simple hand movement such as the type disclosed in U.S. Pat. No. 3,987,685, would be more desirable in text editing systems than a special pen. This is particularly true where such a device would be of the electronic type having no moving parts or components. The simplest form of such a desirable cursor position device would be one responsive to the location of an operator's finger on a special electronic tablet or the like.

U.S. Pat. No. 4,103,252 discloses an electronic cursor positioning tablet having no moving parts where the physical contact of the operator's finger moving across the surface of the device provides coordinate information for movement of a cursor over a visual display in a text editing system. This device functions on the principal of variable capacitance caused by finger movement on the surface of the device in proximity to a plurality of capacitor plates. This device does not employ moving mechanical parts but requires sophisticated electronic circuitry for sensing the variance of capacitance to provide signal outputs representative of X-Y position coordinates.

OBJECTS OF THE INVENTION

It is an object of the present invention to provide a fixed capacitive transducer which is sensitive to finger or probe contact along at least one axis of the transducer.

It is a further object of this invention to provide a finger sensitive transducer that is capable of providing an indication of finger or probe position at any point along the length of the transducer.

Another object of this invention is the provision of a finger touch transducer that may be employed to provide variable attenuation of an input signal supplied to the transducer.

It is still a further object of this invention to provide a finger touch panel comprising two or more capacitive transducers to function a an X-Y position indicating control to move a cursor, for example, over the display on a CRT in a text editing system.

In general, the primary object of this invention is a contact sensitive, capacitive type transducer.

SUMMARY OF INVENTION

In accordance with the invention, a capacitive transducer comprises three principal parts. The first part comprises two plate electrodes in juxtaposed position. These electrodes represent the bottom electrode configuration of the capacitively coupled transducer. The electrodes in their preferred form may have a tapered configuration. The second part of the transducer is an array of segmented electrodes. These electrodes are provided in substantially parallel alignment and represent the top electrode configuration of the capacitively coupled transducer. The third part is a thin dielectric layer or substrate sandwiched between the bottom and top electrode configurations. An AC signal appearing at the input terminal of the transducer will appear at the output terminal of the transducer. The applied signal is connected to one of the two plate electrodes, which acts as an input terminal. A signal detector is connected to the other plate electrode, which acts as an output terminal. The simplest form of such a detector would be a load resistor across which the output signal may be detected.

Each of the top segmented electrodes is capacitively coupled to both bottom plate electrodes. If finger contact is made with the segmented electrode array, a portion of the applied AC signal will be shunted to ground via the operator's body. Because the body provides large capacitance, signal shunting occurs on contact and the amount of shunting is dependent on the position of the finger on the segmented electrode array, as well as the number of segmented electrodes in contact with the finger.

Because the top electrode is an array of separate conductive segments, the capacitive coupling of the transducer varies in value from segment to segment in a direction transverse to the longitudinal extent of the segments. This is due to configuration of the bottom plate electrodes. The variable capacitive effect can be obtained by providing a linearly variable dielectric layer or by providing segment electrodes having linearly increasing segment widths. Thus, the amount of input signal shunted to ground on finger or probe contact depends on both how many electrode segments are instantaneously touched and the physical location of the segments touched relative to the main axis of the plate electrode. For example, when employing a tapered configuration for the plate electrodes to produce increasing capacitance coupling, if finger contact is made near the narrow end of the tapered plate electrodes, attenuation of the input signal will be less than attenuation achieved if the finger contact is made near the widest end of the tapered plate electrodes.

Finger movement transversely of the longitudinal extent of the electrode segments will cause attenuation change. Movement need not be parallel to the main axis of plate electrodes to provide attenuation. The attenuation change varies continuously with finger position across the transducer.

If the taper configuration is linear, the attenuation change will vary linearly. The slope of taper of the bottom plate electrodes controls the rate at which the attenuation changes with movement of finger contact across the electrode segments.

If the number of electrode segments contacted is additively increased from the narrowest taper extent of the plate electrodes to the widest extent of the taper plate electrodes, the attenuation change would be monotonic and vary in a parabolic fashion.

The electrical equivalent of the transducer comprising this invention is two series capacitors with the touch point being at a point between the two capacitors.

In accordance with another aspect of the invention, the capacitive transducer can be employed with at least one other transducer to provide an X-Y position indicator. By positioning the main axis of each transducer toward a central point and in perpendicular relationship, one transducer main axis can represent the X axis and the other transducer main axis can represent the Y axis. A movable conductive piece having a width at least equal to the length of the transducer main axis can be moved about the segmented electrode surface of the transducers and any instantaneous position of the movable piece would be representative of X-Y coordinate points in a cartesian coordinate system.

The frequency of the AC signal supplied to each of the transducers can be the same. However, to avoid possible interference capacitive coupling between adjacent transducers, the employment of different frequency sources is preferred.

Other objects and attainments together with a fuller understanding of the invention will become apparent and appreciated by referring to the following description and claims taken in conjunction with the accompanying drawings.

BRIEF DESCRIPTION OF THE DRAWINGS

In the drawings:

FIG. 3b is a bottom view of the panel of FIG. 3a;

FIG. 4b is a bottom view of the panel of FIG. 4a;

FIG. 5a is another possible taper configuration for the plate electrodes of FIG. 1a;

FIG. 5b is still another possible taper configuration for the plate electrodes of FIG. 1a;

DESCRIPTION OF THE PREFERRED EMBODIMENT

In FIG. 1 there is shown the capacitive transducer 10 comprising this invention in its preferred form. Transducer 10 comprises three principal parts, plate electrodes 11, 12 (FIG. 1a), an array of segmented electrodes 13 (FIG. 1b), and a dielectric layer or substrate 14 (FIG. 1d).

Figure 1A:
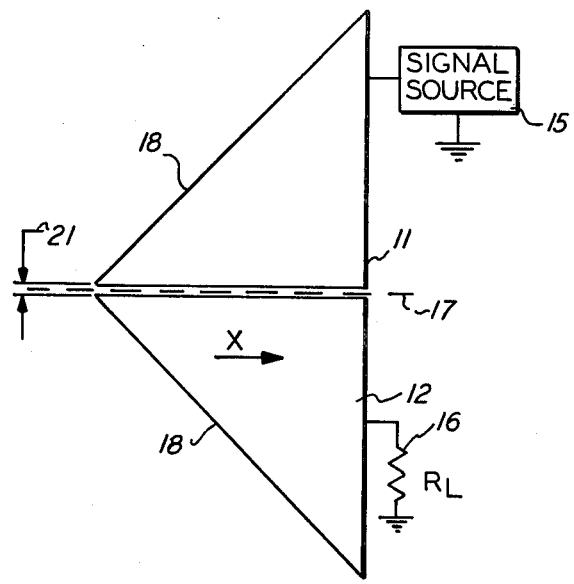
FIG. 1a is a plan view of the bottom plate electrodes of the transducer.
Figure 1B:
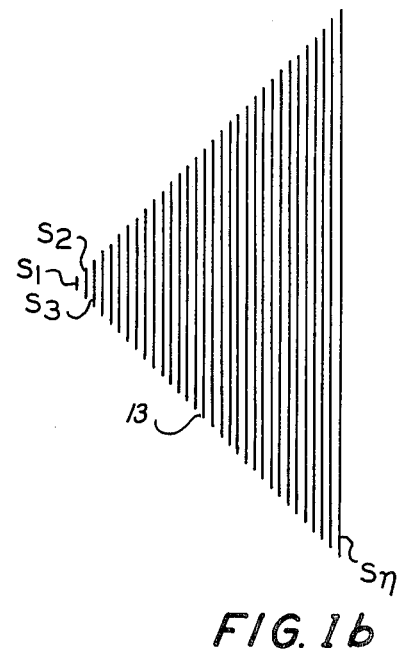
FIG. 1b, is a plan view of the array of top segmented electrodes of the transducer.
Figure 1C:
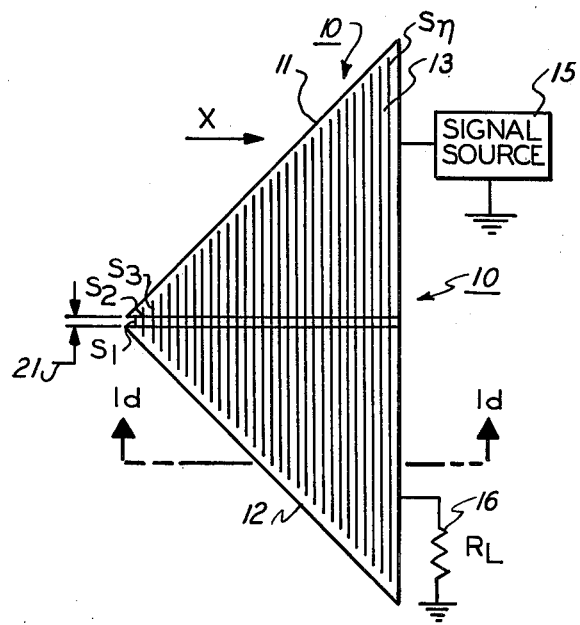
FIG. 1c is a plan view of the assembled transducer.

The plate electrodes 11, 12 are conductive. As shown in FIG. 1a, the plate electrodes 11, 12 are arranged in spaced, juxtaposed position along a main axis 17, i.e. separated by a spacing 21. One plate 11 represents an input terminal to the transducer 10 and is connected to AC signal source 15. The other plate 12 represents the output terminal and is connected to detection means 16, which is shown here as load resistor $R_L$.

Figure 1D:
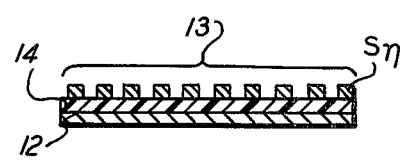
FIG. 1d, is an exaggerated sectional view of the transducer of FIG. 1c as seen from the plane indicated by the line 1d—1d of FIG. 1c.

The segment electrode array 13 comprises a plurality of conductive segments $S_1$ to $S_n$. As best shown in FIG. 1d, the segments, $S_n$, overly the plate electrodes 11, 12 and are separated therefrom by the dielectric substrate 14.

The segmented electrode array 13 is capacitive coupled to the plate electrodes 11, 12. The application of an AC signal of known amplitude from source 15 to plate 11 will appear across resistor $R_L$. If one were to touch the segmented electrode array 13, a portion of the applied AC signal would be shunted to ground via the human body. Because the human body has a large capacitance, signal shunting to ground is possible through the user's body capacitance. Of course the AC signal is of low magnitude so as not to be harmful to the user.

As noted in FIG. 1a, the plates electrode 11, 12 each have a tapered edge 18. Because of this tapered configuration, the amount of attenuation upon finger contact can be selectively varied. The amount of signal shunting to ground depends upon the position of the finger contact along the main axis 17. Finger movement from left to right in FIG. 1c in the X direction will result in increasing capacitance and, therefore, increasing signal attenuation across resistor $R_L$. The increase in capacitance in the X direction is due to increase in plate electrode area because diverging tapers 18 as well as the increase in segment electrode area, because of their increase in length.

It should be noted that the taper 18 need be only provided along one edge of a plate electrode 11 or 12 to achieve this increasing capacitive coupling effect.

The increase capacitive coupling effect need not be derived only from the taper configuration of FIG. 1. As shown in FIGS. 5a and 5b, respectively, the taper configuration can be parabolic in nature, as indicated at 19, or a step function, as indicated at 20. In any case, the increasing capacitive coupling in the X direction will be achieved as long as the taper configuration is monotonic, i.e. the taper increases continually in the X direction without again decreasing, whether the degree of tapering is linear or not.

Figure 2:
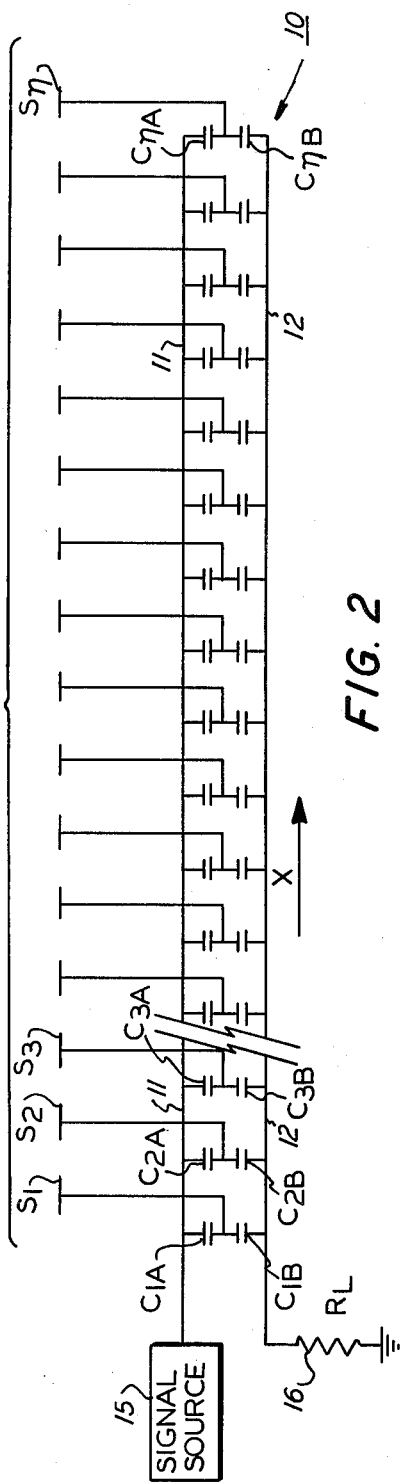
FIG. 2, is an electrical equivalent of the transducer shown in FIG. 1c.

In FIG. 2, an electrical equivalent of the transducer 10 is shown. $C_{na}$ represents the capacitance between each individual segment $S_n$ and plate electrode 11. $C_{nb}$ represents the capacitance between each individual segment $S_n$ and plate electrode 12. There is increasing capacitance coupling in the X direction for each individual segment $S_n$ because the effective plate area represented by plate electrodes 11, 12 and each segment increases in the X direction. This is readily apparent from the equation:

$$C = KA/d$$

where A is the cross-sectional area of the electrodes of a capacitor, d is the dielectric thickness and k is a dielectric constant. Capacitance is, therefore, directly proportional to electrode area. As electrode area increases, so does the capacitance.

The amount of signal attenuation to be obtained with transducer 10 depends upon both how many segments $S_n$ are instantaneously touched and the physical location of the segments $S_n$ touched along the X direction. Thus, upon viewing both FIGS. 1c and 2, touch contact of one or more segments at the left end or portion of the transducer 10 will provide lower attenuation at the transducer output than touch contact at the right end or portion of the transducer.

Movement of one's finger from left to right in the X direction will produce increasing signal attenuation at the output as detected across load resistor $R_L$. The rate of attenuation developed by such movement depends on the rate of finger movement. The rate at which attenuation changes with finger movement from segment to segment depends on the slope of taper 18 of plate electrodes 11, 12 relative to the main axis 17. As previously indicated, the attenuation rate of change could be reduced by providing only one taper 18 per plate electrode set.

Movement of one's finger at a constant rate across the segmented electrode 13 in an X direction will provide linear, monotonic attenuation. Such finger movement where the taper configuration of FIGS. 5a or 5b is employed will, respectively, provide a parabolic or sinusoidal type of attenuation in a monotonic manner.

If one were to employ a probe contact rather than finger contact in connection with the transducer 10 in a manner that segments $S_n$ beginning with segment $S_1$ are initially and continuously engaged in a cumulative manner and at a uniform rate in the X direction, the attenuation of the output signal would be parabolic and monotonic in nature. A hand held metal bar could be used to perform this probe contact function.

Reference up to this point has been made to different taper configurations for plate electrodes 11, 12 as shown in FIGS. 1a, 5a and 5b. However, there are other geometric variations of the transducer 10 by which attenuation can be achieved in the X direction or for providing attenuation to be a function of distance along the main axis 17.

FIGS. 1a, 5a and 5b represent the condition, $$W_p = f(X)$$

where $W_p$ is the width of a plate electrode 11 or 12 and X is the distance in the X direction. In this embodiment, the thickness $d_1$ of the dielectric substrate 14 and the width, $W_s$, of the segments S are fixed.

Figure 5C:
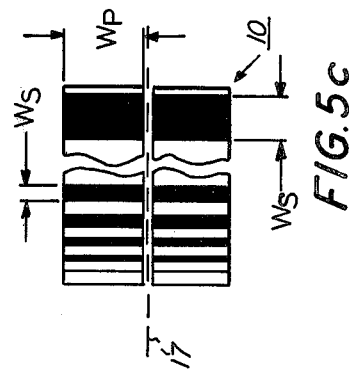
FIG. 5c is an exaggerated plan view of a modified version of the transducers of FIG. 1c wherein the segmented electrode comprises different width segments.
Figure 5B:
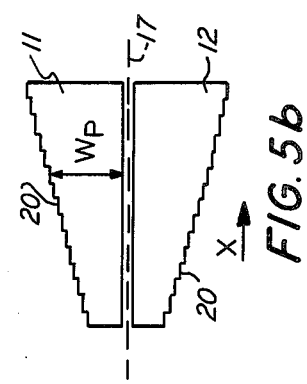
Figure 5A:
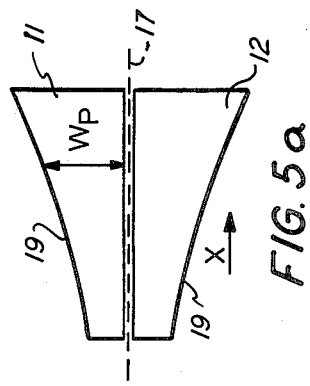

Another geometric consideration is $$W_s = f(X),$$

where the width of the segments $S_n$ can be increased as a function of distance across the transducer as illustrated in FIG. 5c. In this illustration, the thickness, d, of the dielectric and the plate electrode width, $W_p$, are fixed.

Figure 5D:
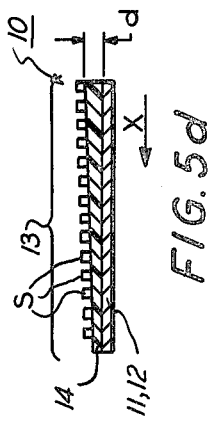
FIG. 5d is an exaggerated cross-sectional view showing another modified version of the transducer of FIG. 1c wherein the dielectric layer or substrate varies linearly along its length.

A third geometric consideration is $$d = f(X),$$

where the thickness of the dielectric substrate increases as a function of distance across the transducer as illustrated in FIG. 5d. In this illustration, the width, $W_s$, of the segments $S_n$ and the width, $W_p$, of the plate electrodes 11, 12 are fixed.

Thus, what is meant by "increasing capacitive coupling" is the built-in increase in capacitance obtained from one end of the transducers to the other end in the X direction by either providing a tapered configuration, a change in dielectric thickness or a change in electrode segment width or possibly a combination of one or more of these variable geometric parameters.

A transducer 10 can be made on a thin substrate 14 of Kapton or Mylar film which initially has copper cladding on both surfaces. A pattern of the pair of triangular plate electrodes 11, 12 are then etched into the copper cladding on one film surface while the array of electrode segments $S_n$ is etched into the copper cladding on the other film surface.

In FIGS. 3 and 4, arrangements are shown for employing transducer 10 in an X-Y position indicator 26 and 27, respectively. In FIG. 3 two transducer 10a and 10b are employed while in FIG. 4 four transducers 10a, 10b, 10c and 10d are employed. The operation of these two embodiments is basically the same except that in FIG. 3, only one transducer is employed to produce a signal representative of the X or Y coordinate positions whereas in FIG. 4 two transducers are employed to identify the X or Y coordinate positions. This latter arrangement is more preferred from the standpoint of accuracy because a difference signal can be derived which is more precise as to exact position in a Cartesian coordinate system.

For purpose of explanation, simultaneous reference will be made to both FIGS. 3 and 4 since indicator 27 of FIG. 4 is a multiple variation of indicator 26 of FIG. 3, like elements having the same reference numerals.

Figure 3B:
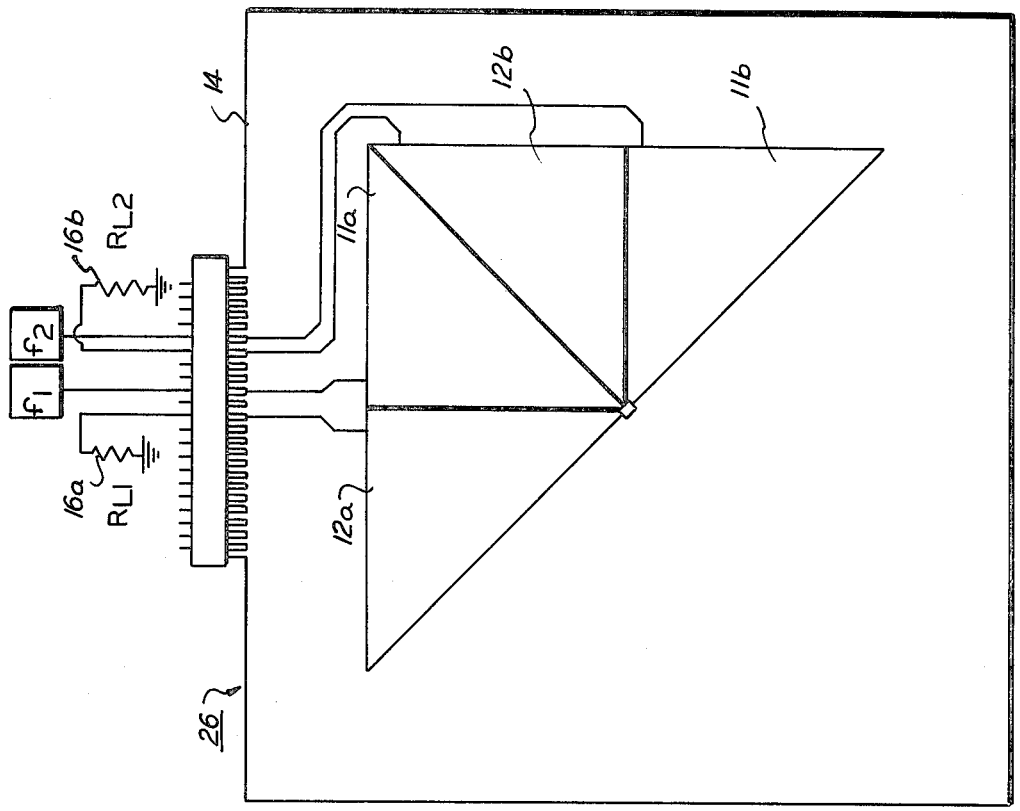
Figure 3A:
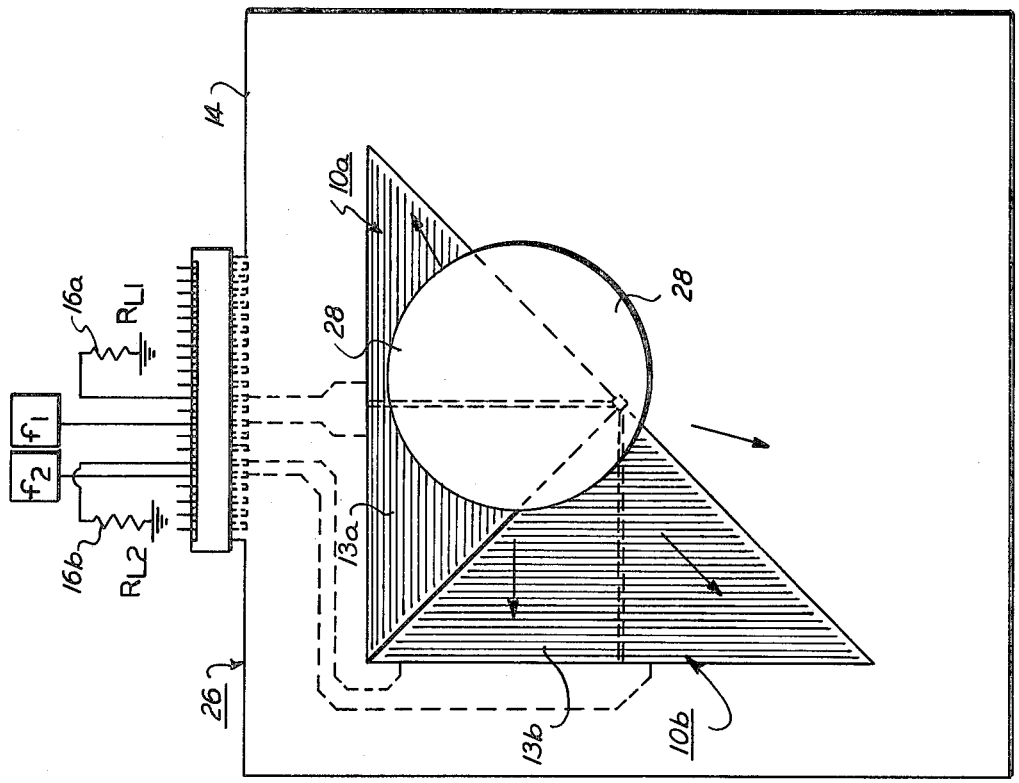
FIG. 3a, is a plan view of two capacitive transducers comprising this invention employed in a touch panel configuration to function as an X-Y position indicator.
Figure 4B:
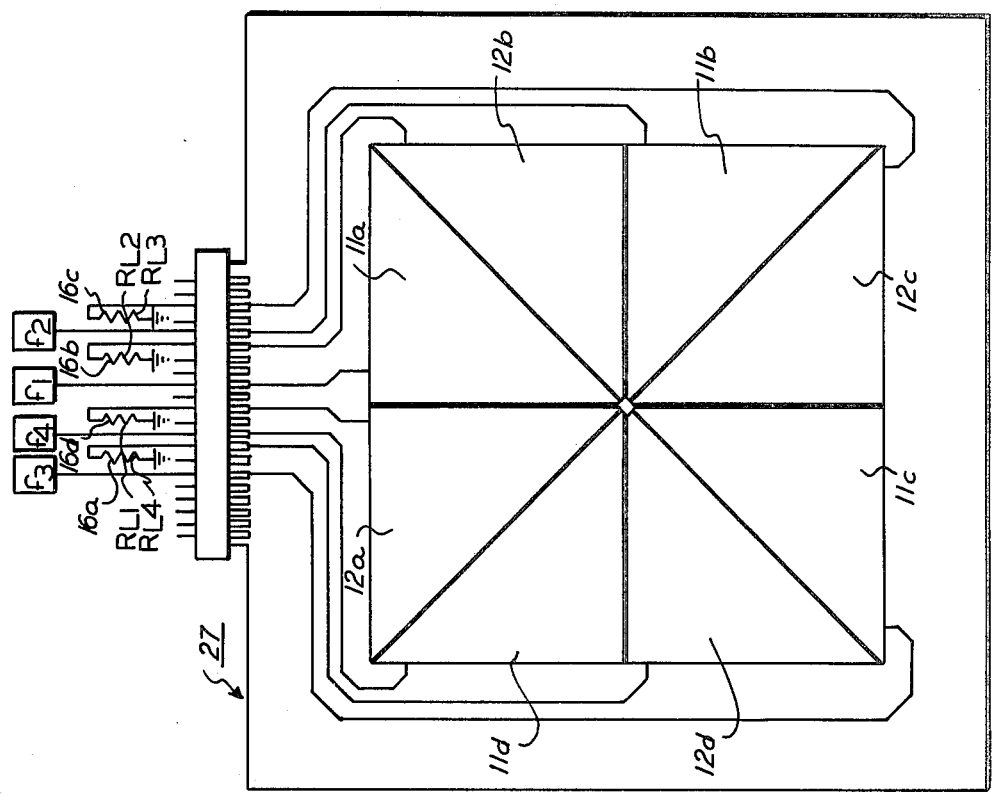
Figure 4A:
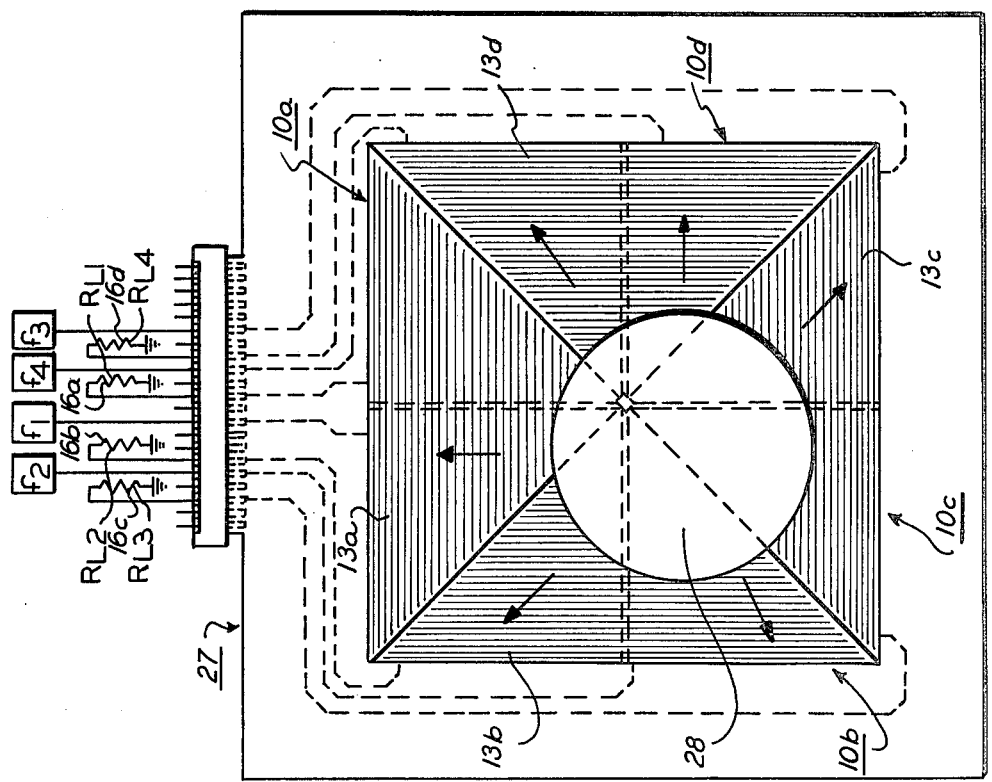
FIG. 4a is a plan view of four capacitive transducers comprising this invention employed in a quadrature touch panel configuration to function as an X-Y position indicator.

As shown in FIGS. 3a and 4a, the substrate 14 is provided, respectively, with two and four transducers 10a, 10b, 10c and 10d, having segmented electrode array's 13a, 13b, 13c and 13d. Transducers 10a and 10c are positioned on the Y coordinate while transducers 10b and 10d are positioned on the X coordinate. These coordinates are aligned with the main axis 17 of each of the transducers as discussed in connection with FIG. 1.

The plate electrodes 11, 12 are respectively provided for each of the transducers 10a, 10b, 10c and 10d. As shown in FIGS. 3b and 4b, input terminal plate electrodes 11a, 11b, 11c and 11d are, respectively, connected to AC signal sources $f_1$, $f_2$, $f_3$ and $f_4$. Output terminal plate electrodes 12a, 12b, 12c and 12d are, respectively, connected to detection means 16a, 16b, 16c and 16d.

Signal sources $f_1$, $f_2$, $f_3$ and $f_4$, may be of the same frequency. However, to improve performance as an X-Y position indicator, each signal source may have a different signal frequency. Any undesirable coupling between adjacent transducers can be filtered out and a reliable coordinate values established by determining the difference in signal value (amplitude) between oppositely opposed quadrature transducers 10a and 10c or 10b and 10d in FIG. 4 or by the individual signal value for the coordinate transducers 10a or 10b in FIG. 3.

A conductive probe contact 28 is used to operate the X-Y position indicators 26, 27. The contact 28 may be moved about the surfaces of the segment electrodes with the index finger, for example, providing simultaneous engagement with more than one coordinate transducer. As shown in FIG. 3a, diameter, D, of the disc type contact 28 is equal to the distance H, the height of the equilateral triangle formed by the segment electrode arrays 13. The contact 28 may be moved to either completely cover a particular array or not cover the array at 11, not even one electrode segment of a particular array.

Movement in any direction of the contact 28 will cover and contact a selected number of segments, $S_n$, of one or more segmented electrode arrays. The amount of segment electrode coverage in any quadrant will shunt to ground a proportional amount of the AC signal supplied to the respective transducer indicative of the position of the contact 28 relative to an X-Y coordinate system in the plane of substrate 14. The central position for coordinates would be the center of contact 28 in FIGS. 3a and 3b.

A transducer of the present invention was fabricated from copper clad polyimide 0.001 inch thick. The transducer consisted of the triangular pattern depicted in FIG. 1. The copper electrodes of the transducers were formed by acid etching. The segments, $S_n$, of the segmented electrode array were each 0.015 inch wide and separated from each other by 0.005 inch. The distance from the central apex of each segmented electrode array to its base (distance H in FIG. 3a) was 2 inches.

The input terminal plate electrode of the transducer was connected to a pulse generator to supply a 100 K Hz signal. The output terminal plate electrode was connected to a 1 megohm load resistor. The resulting waveforms caused by finger contact on the segmented electrodes were examined by an oscilloscope connected across the load resistor. The output signal could be smoothly attenuated in a linear manner in the X direction from 0% to 20% by continuous finger movement from the transducer apex to the widest end of the transducer.

The embodiments of FIGS. 3 and 4 are not intended to be exhaustive or limiting of the invention but are given for purposes of illustration and the manner of applying transducers 10 in practical application. Thus, various modifications can be made to the transducer, some of which have been illustrated, to make it suitable for another particular application.

While the invention has been described in conjunction with specific embodiments, it is evident that many alternatives, modifications and variations will be apparent to those skilled in the art in light of the foregoing description. Accordingly, it is intended to embrace all such alternatives, modifications, and variations as fall within the spirit and scope of the appended claims.

I claim:

1. A capacitive transducer comprising at least two plate electrodes aligned along a main axis in spaced juxtaposed relation, a substantially parallel array of segmented electrodes each of smaller dimensional width than said plate electrodes and aligned in a direction transverse to said main axis overly said plate electrodes but separated therefrom by dielectric means, said segmented electrodes capacitively coupled to said plate electrodes in an increasing capacitive and monotonic manner from one end of the transducer to the other along said main axis.

2. The transducer of claim 1 wherein said plate electrodes are of triangular shaped configuration.

3. The transducer of claim 2 wherein said segmented electrode array has the configuration of said plate electrodes.

4. The transducer of claim 1 wherein one of said plate electrodes is an input terminal, a varying signal source connected to said input terminal to provide an input signal, means engageable with one or more of said segment electrodes and movable thereacross to shunt a portion of said input signal.

5. The transducer of claim 4 wherein a detection means connected to the other said plate electrodes, said attenuated input signal being detected by said detection means.

6. The transducer of claim 5 wherein said detection means is a load resistor.

7. The transducer of claim 1 wherein said plate electrodes are provided with a taper along one edge thereof.

8. The transducer of claim 7 wherein said taper is parabolic.

9. The transducer of claim 7 wherein said taper is a step function.

10. The transducer of claim 7 wherein said taper is linear and is disposed at an acute angle relative to said main axis.

11. The transducer of claim 1 wherein the segments comprising said electrode array are elongated stripes having narrow and identical widths.

12. The transducer of claim 11 wherein the width of said segments is greater than the distance of separation of said segments.

13. The transducer of claim 1 wherein the segments comprising said electrode array are elongated stripes having narrow widths, the widths of said segments of increasing magnitude from one end of the array to the other.

14. The transducer of claim 1 wherein the thickness of said dielectric means is of increasiong magnitude from one end of the transducer to the other along said main axis.

15. The transducer as claimed in claim 1 for use as an X-Y position indicator, at least two of said transducers being employed, the main axis of one of said transducers parallel to the X axis of a coordinate system and the other of said transducers parallel to the Y axis of the same coordinate system.

16. A capacitive transducer for varying the amplitude of an input signal comprising a pair of tapered conductive plate electrodes in a juxtaposed relation, a signal source connected to one of said plate electrodes to provide an input signal, a detection means connected to the other of said plate electrodes, an array of segmented conductive electrodes each of smaller dimensional width than said plate electrodes and in substantially parallel alignment positioned over both of said plates and separated therefrom by a dielectric layer, each of said segment electrodes being capacitively coupled to both of said plate.

17. The transducer as claimed in claim 16 for use as an X-Y position indicator, at least two of said transducers being employed, the main axis of one of said transducers parallel to the X axis of a coordinate system and the other of said transducers parallel to the Y axis of the same coordinate systems.

18. The transducers of claim 17 wherein a signal source for each of said at least two transducers has a different frequency.

19. The transducers of claim 17 wherein each of said at least two transducers have a triangular configuration.

20. The transducers of claim 17 wherein four of said transducers are used as said X-Y position indicator, the main axis of pairs of oppositely disposed transducers being, respectively, parallel to the X of Y axis of said coordinate system.

* * * * *

Disclaimer 4,177,421.—*David D. Thornvurg,* Los Altos, Calif. CAPACITIVE TRANSDUCER. Patent dated Dec. 4, 1979. Disclaimer filed Mar. 30, 1981, by the assignee, *Xerox Corp.*

Hereby enters this disclaimer to claims 1, 2, 3, 6, 7, 8, 9, 10, 11, 12 and 16 of said patent.

[*Official Gazette May 26, 1981.*]